United States Patent [19]

Twist

[11] Patent Number: 5,058,077
[45] Date of Patent: Oct. 15, 1991

[54] COMPENSATION TECHNIQUE FOR ECCENTERED MWD SENSORS

[75] Inventor: James R. Twist, Humble, Tex.

[73] Assignee: Baroid Technology, Inc., Houston, Tex.

[21] Appl. No.: 594,367

[22] Filed: Oct. 9, 1990

[51] Int. Cl.$^5$ .............................................. G01V 1/40
[52] U.S. Cl. ...................................... 367/25; 367/34; 73/151
[58] Field of Search ...................... 367/25, 29, 34, 83, 367/33; 340/853, 856, 861; 73/151; 364/422

[56] References Cited

U.S. PATENT DOCUMENTS

| | | | |
|---|---|---|---|
| 3,876,016 | 4/1975 | Stinson | 175/45 |
| 4,017,859 | 4/1977 | Medwin | 342/383 |
| 4,661,933 | 10/1987 | Seeman et al. | 367/27 |
| 4,698,501 | 2/1988 | Paske et al. | 250/265 |
| 4,773,263 | 9/1988 | Lesage et al. | 73/151 |
| 4,829,176 | 5/1989 | Paske et al. | 250/254 |
| 4,864,129 | 9/1989 | Paske et al. | 250/269 |
| 4,894,534 | 1/1990 | Paske et al. | 250/254 |
| 4,903,245 | 2/1990 | Close et al. | 340/853 |

FOREIGN PATENT DOCUMENTS

| | | |
|---|---|---|
| 282402 | 9/1988 | European Pat. Off. . |
| 2179736A | 3/1987 | United Kingdom . |
| 318343 | 6/1989 | United Kingdom . |

OTHER PUBLICATIONS

Milheim et al., "The Effect of Bottomhole . . . Trajectory of a Bit", Dec. 1981, 2323–2338.
Wolf et al., "Field Measurement of Downhole Drillstring Vibrations", Sep. 22, 1985.
Vandiver et al, "Case Studies of the . . . Motion of Drill Collars", Feb. 22, 1989, 291–304.
Paske et al., "Theory and Implementation . . . Made While Drilling", Sep. 23, 1990.
Paske et al., "Measurement of Hole Size While Drilling", Jun. 24, 1990.
Best et al., "An Innovative Approach . . . for Hole Size Effect", Jun. 24–27, 1990, 1–21.
Paske et al., "Formation Density Logging While Drilling", Sep. 27, 1987.
Wraight et al., "Combination Formation . . . While Drilling", Jun. 11, 1989.

*Primary Examiner*—Ian J. Lobo
*Attorney, Agent, or Firm*—Browning, Bushman, Anderson & Brookhart

[57] ABSTRACT

The technique according to the present invention is useful for generating a corrected well log which otherwise would include erroneous signals from downhole sensor. Such signal error may be caused, for example, by periodic movement of the drill collar axis with respect to the borehole axis, eccentric rotation of the drill collar with respect to the borehole, or a whirling or precessing of the drill collar in the borehole. According to the technique of the present invention, these sensor signals are generated at time intervals of less than one-half the period of the highest frequency of the periodic movement. Discrete sensor signals are averaged to generate an average sensor signal as a function of borehole depth. Discrete sensor signals are also recorded to generate a time-varying sensor signal profile, the magnitude of frequency components of the time-varying sensor signal profile is determined, and the average sensor signal is corrected as a function of the determined magnitude of the frequency components. The corrected sensor signals are preferably recorded as a function of borehole depth to generate a corrected well log. The system according to the present invention includes sensors, a computer, a signal processor, and a plotter suitable for outputting a corrected well log.

26 Claims, 2 Drawing Sheets

COMPENSATION TECHNIQUE FOR ECCENTERED MWD SENSORS

BACKGROUND OF THE INVENTION

1. Field of the Invention

The present invention relates to techniques involving the filtering and processing of downhole sensor signals during measurement-while-drilling operations. More particularly, the invention relates to improved MWD data collection and data analysis techniques for determining information from downhole detectors mounted in a drill collar eccentrically rotating within a borehole.

2. Description of the Background

In the oil and gas drilling industry, data collected and plotted as a function of depth in a borehole is referred to as a well log. In recent years, increased emphasis has been placed upon downhole data collected and displayed while drilling. Measurement-while-drilling or MWD techniques are favored due to the ability of the drilling operator to alter procedures in real time, i.e., while drilling. Accordingly, a great deal of research has been and will continue to be expended to enhance MWD data sensing, transmission, filtering, processing and analysis techniques to better assist the drilling operator and improve drilling performance.

Those skilled in the downhole data collection and analysis art have recognized for years that most sensors on a drill collar do not accurately sense information if the drill collar is not centered, or the position of the logging tool not known, within the borehole due to the continually varying thickness of the drilling mud and its affect on the measured formation property. In recent years, substantially increased emphasis has been placed upon highly deviated boreholes and/or horizontal drilling, both of which increase the likelihood that the drill collar will not be centered within the borehole. When the bottom hole assembly (BHA) is substantially inclined rather than being vertical, the drill bit tends to form elliptical or slotted boreholes rather than boreholes with a circular cross-sectional configuration. Even if the borehole has a circular cross-sectional configuration, the bottom hole assembly (BHA) itself may not be centered in the borehole if the borehole diameter is substantially greater than the diameter of the bit. Although centralizers may be used to position the BHA closer to the geometric center of the borehole, such centralizers and/or stabilizers reduce the versatility of the BHA and thus are often not preferred when drilling highly deviated boreholes. Moreover, MWD sensors are typically located a distance of from 5 meters to 50 meters from the drill bit, so that the drill bit may in fact drill a borehole with a circular configuration, but the borehole geometry may change as "wash outs" occur. By the time the borehole has been drilled to the depth required for the sensors to monitor the previously drilled borehole and/or formation characteristics, the sensors are frequently no longer sensing information in a circular borehole. As an example of the problems involved in current MWD sensing and data analysis, nuclear radiation detectors are commonly mounted in a drill collar and lowered into a borehole to perform MWD well logging. As previously noted, it is often preferred that the rotating drill collar not be constrained by stabilizers or centralizers designed to maintain the BHA in the center of the borehole, and the drill collar is thus free to position itself in the borehole in a centered or concentric position, or may be touching a side of the borehole in a fully eccentric position. Of course there are numerous possible positions between the concentric and the fully eccentric positions, and frequently the position of the drill collar relative to the axis of the borehole is typically changing as the drill collar and drill bit are rotating. The position of the drill collar and the sensors relative to the axis of the borehole affects the signal produced by the nuclear radiation detectors, although the techniques of the prior art have not been able to practically correct for the changing eccentric rotation of the drill collar in the borehole.

In a recent paper by D. Best et al entitled "An Innovative Approach to Correct Density Measurements While Drilling for Hole Size Effects" 31st. SPAWLA, June 24–27, 1990 (paper G), a statistical approach was taken to interpret the rotating eccentered tool. The technique disclosed in this paper examines the average and standard deviation of the detector signal as the tool is rotated. The logging tool is calibrated in the fully eccentered position, and the assumption is made that the extreme value of the detector signal corresponds to a fully eccentered tool. This technique will not adequately handle the partially eccentered case, i.e., it will not compensate for the error of not being fully eccentered.

Techniques involving the measurement of formation density while drilling are described in an article by W. C. Paske et al entitled "Formation Density Logging While Drilling". This article generally describes an MWD logging technique currently offered by Sperry-Sun Drilling Services, Inc. in Houston, Tex. An advantage of this Sperry-Sun logging tool design is that the detectors, which may be Geiger-Mueler tubes, are placed around the circumference of the drill collar and are axially spaced so that signals are detected in all directions, thus increasing the signal-to-noise ratio and the useful information from the detectors. The placement of the detectors and shielding techniques enable some detectors to be very sensitive to the effects of centering (the front bank of detectors), while other detectors (the side and back banks of detectors) are less sensitive to eccentered rotation of the drill collar.

In recent years, increased emphasis has been placed upon techniques capable of correcting measurements taken in boreholes significantly larger than gage. In a recent article by W. C. Paske et al titled "Measurement of Hole Size While Drilling", a technique is described to determine the borehole size or caliper when using a rotating MWD logging tool. Using techniques described in this article, MWD generated formation density logs may be corrected to compensate for increased borehole diameters. An article by P. Wraight et al entitled "Combination Formation Density and Neutron Porosity Measurements While Drilling" discloses a measurement-while-drilling tool designed to provide accurate neutron porosity and density logs which are compensated by the mud standoff between the tool and the formation which occurs when the tool is rotating in an oversized borehole. These prior art techniques have increased somewhat the accuracy of well logs, but are not capable of accurately compensating for the affects of the MWD sensors mounted in a drill collar rotating eccentrically within a borehole.

The disadvantages of the prior art are overcome by the present invention, and an improved MWD data analysis technique is hereinafter disclosed for correcting the effects on MWD sensors within a drill collar eccentrically rotating within a borehole. The techniques of the present invention may be used to measure the amount of eccentering of the drill collar in the borehole and correct for the effects of eccentering. The present invention may also be used to measure the actual rotational speed of the drill collar within the borehole.

SUMMARY OF THE INVENTION

The technique of present utilizes information contained in the time varying MWD sensor signal which is produced as the sensor rotates eccentrically within the borehole, and generates a compensation signal to correct for the eccentric condition. Useful information is extracted from the MWD sensor signals by using a fast fourier transform (FFT) technique. For a complete discussion of an FFT technique and signal processing technique suitable for the present invention, see either S. D. Stearns and D. R. Hush, "Digital Signal Analysis". Prentice Hall 2nd edition, or J. W. Cooley and J. W. Tukey. "An Algorithm for the Machine Calculation of Complex Fourier Series", Math Comput. Vol. 19, April 1965, Page 297. The amplitude of the peaks in the frequency spectra (generated by using the FFT) are used to generate a correction signal which alters the average sensor signal to closely represent the signal which the sensor would have generated had it been centered in the borehole. The FFT analysis technique of the present invention may thus compute eccentering corrections based on the time varying MWD signals anytime the drill collar on which the sensors are mounted eccentrically rotates in the borehole. The primary peaks which occur in the FFT spectra usually can be attributable to the eccentered rotation of the tool in the borehole, and will be produced by analysis of signals from any MWD sensor which is responsive to varying mud standoff as the sensor eccentrically rotates in the borehole. Information may be used to not only correct MWD signal information caused by the eccentric condition and thereby generate more accurate MWD logs, but may also be used to determine the true rotational speed of the drill collar on which the sensors are mounted.

Signals from the MWD detectors are recorded as a function of time, and tool motion eccentricity is resolved by sampling two or more times per period for the highest frequency present in the sinusoidal motion, e.g., eccentric rotation or tool axis motion and rotation. By recording and analyzing these time varying signals, correction for eccentering may easily be determined. Rather than averaging the data over a number of sample times, high frequency data is thus recorded and analyzed by performing a fast fourier transform on the time varying signals to provide a log that is corrected for the effects of eccentering. The measured time varying sensor signals in the frequency spectra comprise an average value (with a harmonic number zero of the FFT), a time varying component, and random noise. The time varying component is related to the rotational motion and thus the eccentering of the MWD sensor in the borehole. If a tool is centered in a round borehole, the time varying part of the detector signal is zero. Accordingly, one end of the correction or calibration curve attributable to eccentricity and used to generate the signal correction as a function of eccentered distance is known, i.e., the point at which the MWD tool is centered in the borehole. The compensating signal increases as the eccentricity of the tool in the borehole increases. The maximum amplitude of the time varying part of the MWD signal depends on formation density, mud density, and borehole size: For any combination of conditions, a point of maximum eccentering may be determined, and intermediate the points thereafter calculated. The true or compensated formation density and borehole size may thus be determined by an iterative procedure using the time varying sensor signals.

The data collection time preferably is short compared to the period of any motion of the MWD sensor in the borehole in order to reduce the effects of spatial smearing of the detector signals and satisfy the Nyquist limit. The fast fourier transform of the signal verses time is obtained, and the frequency spectra examined visually or by a computer program for evidence of eccentric rotation of the MWD sensor, which is apparent by a peak in the frequency FFT spectra corresponding to the frequency of rotation of the MWD sensor. The compensation system may then generate a correction signal to correct for the effects of eccentering of the detector signals, since the peak of the frequency FFT spectra corresponding to the fundamental rotational frequency is a function of the magnitude of eccentering. The technique may also be used to measure the rotational frequency of the MWD sensor.

Although a nuclear radiation detector useful for determining formation density has been briefly described above, it should be understood that the technique of the present invention may be used to generate correction signals caused by eccentricity for various MWD sensors that produce signal variations as the tool rotates eccentrically within the borehole. Exemplary MWD sensors are acoustic, gamma, neutron, and electromagnetic sensors.

It is an object of the present invention to provide a compensation technique useful for determining the amount of eccentering of a drill collar having MWD sensors in a borehole, and to correct for the effects of eccentering.

It is a further object of the present invention to provide a compensation technique useful for correcting various downhole sensor signals to substantially reduce or eliminate the error attributable to eccentric rotation of the sensors in the borehole.

It is a feature of this invention that the compensation technique increases the accuracy and reliability of MWD logs while allowing the sensors to be placed desirable close to the bit.

It is a further feature of the present invention to reduce or eliminate the need for stabilizers or centralizers in a bottom hole assembly by allowing correction of the MWD logs for eccentering, thereby allowing directional drilling with "slick subs" which increase the versatility of the tool for use in various drill strings.

It is also a feature of the invention that the data analysis technique may be used to both correct for eccentering of the MWD sensors and thus the drill collar in the borehole and to calculate the rotational speed of the sensors in the borehole.

It is yet another feature of the invention to provide a technique for generating a signal which varies in response to the degree of eccentering of the MWD sensors in a borehole, such that a correction signal may be used to correct detector signal error as a result of borehole eccentricity.

It is an advantage of the invention that more accurate and reliable MWD logs may be obtained without significantly altering the MWD tool.

These and further objects, features, and advantages of the present invention will become apparent from the following detailed description, wherein reference is made to the figures in the accompanying drawings.

DETAILED DESCRIPTION OF PREFERRED EMBODIMENTS

For exemplary purposes, the techniques of the present invention are particularly described with respect to compensating an MWD formation density signal obtained from sensors mounted within a drill collar. The detectors may be geiger-mueler tubes or other nuclear type of nuclear radiation detectors, and may be circumferentially and axially spaced within the drill collar. It should be understood, however, that the technique described herein may be used to compensate various downhole sensor in a variety of configurations with different axial and circumferential spacings with respect to the radiation source, as well as single or multiple sensor banks.

One of the fundamental problems that exist with an MWD formation density or borehole caliper measurement is the effect that eccentering has on the measured borehole density or the measured borehole diameter, particularly in holes which have been enlarged, e.g., washouts. This error in measurement arises because sensors that are eccentered in a borehole inherently indicate the wrong formation density or borehole diameter, with the amount of error being related to the varying distance of the MWD sensor from the borehole wall. In practice, it has heretofore been difficult to determine the formation density or the borehole diameter in the case of an eccentered rotating tool or a tool rotating in a washedout borehole. The technique of the present invention can be used to correct MWD sensors signals attributable to the effects of eccentering, thereby improving MWD density measurements and borehole caliber information, and thus generating more accurate MWD logs.

According to the present invention, an MWD density log may be generated that is compensated or corrected for the effects of eccentering. A compensating signal is generated that varies directly as the amount of eccentering varies, and provides a means by which the average signals from the MWD detectors can be easily corrected. Since eccentering of a tool in a borehole is typically very difficult to control in actual drilling operations, the techniques of the present invention enhance the desirability of "slick" tools which do not rely upon stabilizers or centralizers for attempting to maintain the tools centered within the borehole. The correction technique of the present invention may quickly respond as the tool penetrates different formations and undergoes rapid changes in drilling conditions which affect the degree of eccentering.

The correction technique of the present invention requires that the sensor signals are time varying, e.g., the tool be rotating within the borehole. In most cases, there will be some amount of eccentering present, so that peaks in the FFT of the MWD density sensors signals will be generated when the tool is eccentrically rotating within the borehole and the density of the formation is different than the density of the mud in the borehole. It should be understood that a time varying signal will be generated any time the sensor in the tool is responsive to a time-varying condition caused by eccentric rotation or borehole irregularity. It should thus be understood that the present invention will generate peaks in the frequency spectra (FFT of the sensor signal) when the tool is eccentrically rotating within the borehole, as explained hereafter, but also under other conditions which create an asymmetry in the environment in which the tool is rotated. The detectors may thus be used to detect a washout condition in one side of a borehole, to detect that the tool is eccentrically rotating in a borehole with either a circular or substantially non-circular cross-section, or to determine the presence of formation beds that are not perpendicular to the axis of the tool as the tool rotates. Each different situation which produces asymmetry in the borehole, e.g., one sided washouts, tilted bed, non-circular borehole, will have its own unique signature in the frequency spectra. Using signature analysis, it can be determined what is producing the observed frequency spectra, and thus determine some information about the shape of the surrounding rock formation/borehole. For example, if the borehole is washed out and the washout is irregular in shape, this will be reflected in the harmonic frequency content of the frequency spectra of the detector signal. The concepts of the present invention may also be used as a detector to determine, for diagnostic purposes, when the tool is actually rotating in the borehole.

The signals from the detector of the MWD sensor are recorded as a function of time. Provided the MWD sensor is rotating in a borehole with some periodic motion, such as will occur for an eccentrically rotating tool, the measured signal, s(n), is made up of an average value (harmonic number 0 of the FFT), a time varying component, and random noise. The time varying component is related to the eccentered rotation of the MWD sensor in the borehole. The data collection time is short compared to the period of any motion of the MWD sensor in the borehole in order to satisfy the Nyquist limit. A fast fourier transform (FFT) of the signal verses time is taken, and the frequency spectra examined for evidence of eccentric rotation of the MWD sensor. Rotation is apparent by the peak of the frequency FFT spectra corresponding to the frequency of rotation of the MWD sensors. The technique can accordingly be used to compensate for the effects of eccentering on the detector signal, since the magnitude of the peaks corresponding to the fundamental rotational frequency are functionally related to the magnitude of eccentering. The technique may also be used to measure the rotational frequency of the MWD sensor.

Figures 1, 2:
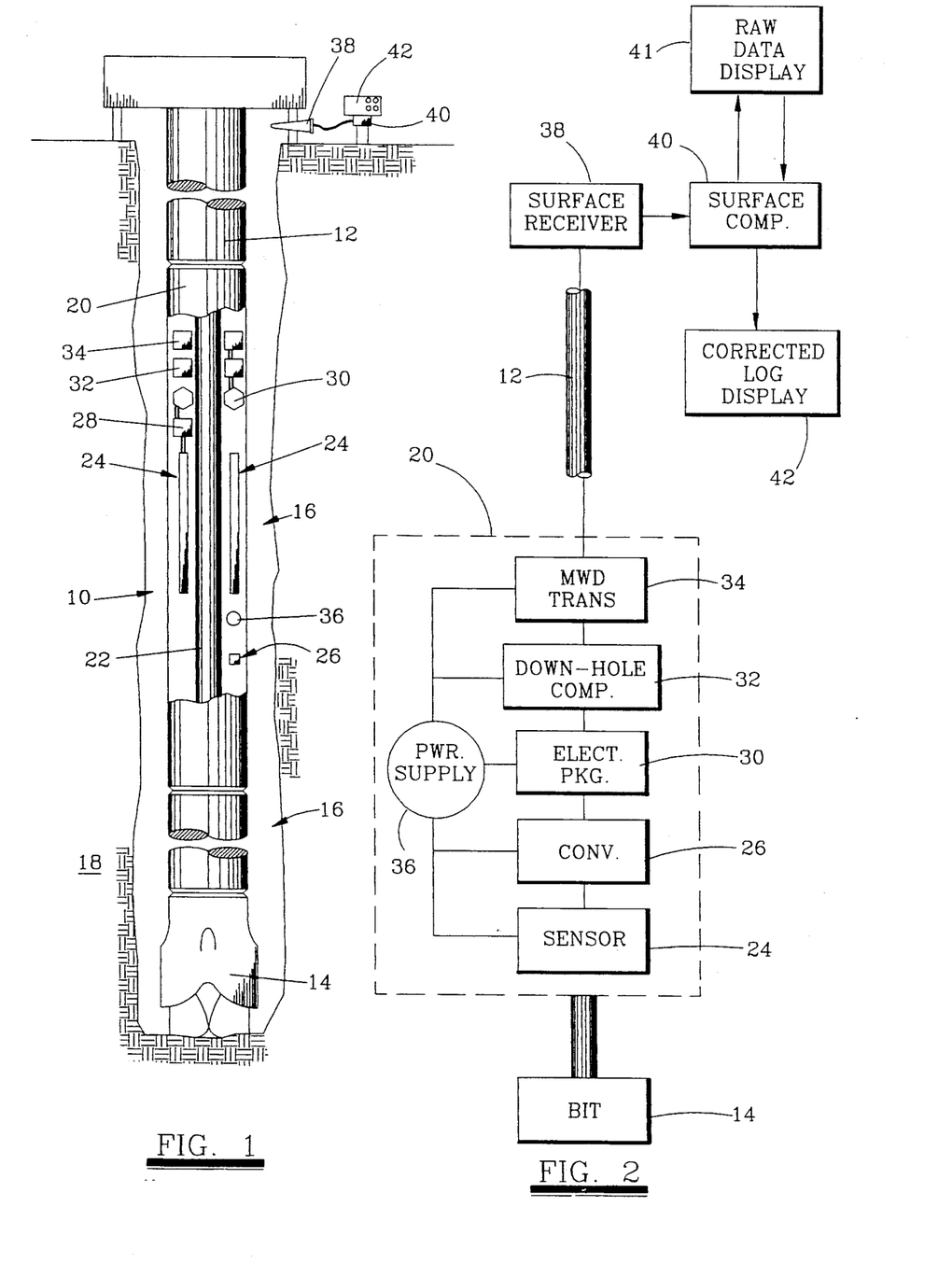
FIG. 1 is a simplified pictorial view illustrating a measurement-while-drilling system according to the present invention with formation density sensors within a downhole MWD tool.
FIG. 2 is a block diagram of the system used for generating a correction signal in accordance with the present invention.

FIG. 1 depicts an MWD tool 10 according to the present invention at the lower end of a drill string 12, with a conventional rotating bit 14 forming a borehole 16 through the formation 18. The tool 10 includes a conventional drill collar section 20 having a bore 22 therethrough for passing drilling fluid to the bit 14. The drilling fluid washes the bit 14 in conventional fashion, and drilling fluid flows upward to occupy the annulus between the drill collar and the formation. The drill collar 20 houses a plurality of MWD formation density sensors 24 which are mounted inside a steel drill collar 20 as shown. Each of the sensors 24 and a conventional gamma source 26 are mounted inside the drill collar 20, and thus rotate with the drill collar and the bit. The bit and the drill collar may be rotated by rotating the entire drill string 12 at the surface, although preferably the bit is rotated by a downhole motor of the type generally used in directional drilling operations.

Also mounted inside the drill collar 20 is a signal converter 28, a downhole electronics package 30, a downhole recorder and/or computer 32, an MWD transmitter 34 and a power supply 36. The converter 28 receives voltage signals from the sensors 24 and outputs a frequency signal in response thereto, which signals may be initially filtered or massaged by downhole electronics package 30, and the signals optionally stored in computer 32. The sensed data is may be transmitted to the surface in real time utilizing the mud pulse transmitter 34, although the same data may be stored in computer 34 for subsequent verification or for initial analysis to generate connection signals after the tool 10 is returned to the surface, and only averaged data transmitted to the surface by mud pulse transmitter 34. All electrical downhole components are powered by battery source 36, or may optionally be powered by a generator or turbine. Transmitted data is received at the surface by mud pulse receiver 38, and the data then input to surface computer 40, where the signals are preferably compensated according to the techniques of the present invention. The raw (non-compensated) data and the corrected data preferably are output in real time, and may be displayed as a log on displays 41 and 42, respectively, so that the operator can better determine downhole conditions and formation parameters.

The MWD sensor data is collected for a predetermined time by a 16 bit counter-timer within the electronics package 30, the data latched or stored in computer 32, and the counter reset after the preset sample time has elapsed. The counts may be stored in the memory of the computer 32 and later input into a surface computer for analysis when the tool 10 is returned to the surface. The data collection times are kept short, and less than half of the rotational period of the drill string in the borehole, in order to properly resolve the motion of the tool in the borehole. In practice, the more sample times per complete revolution of the MWD tool, the better the time variation of the sensor signal is mapped out as a function of time. The lower limit of the sample time is typically determined by the signal-to-noise ratio. As the sample time is shortened, the number of counts recorded is proportionally reduced but the random fluctuations decrease more slowly. Since the random fluctuation in the measurement is related to the square root of the number of counts recorded, the fractional amount of random fluctuation increases as the number of counts decreases.

In the case of a perfectly centered MWD tool, i.e., the sensors 24 and the drill collar rotating continually about an axis concentric with the axis of the borehole, the time varying component of the sensor signal would be zero. Nevertheless, the signal would typically contain high and low frequency noise that could be filtered out by surface or subsurface electronics. Since the side banks on the SFD tool are symmetrically placed with respect to the radiation source, the information contained in the sensor signals is equivalent within a phase difference. There are random noise components present in addition to the signal which contains the environmental and formation information. A cross correlation function, as described in the Stearns and Hush article previously cited, calculated between the side banks will tend to substantially reduce the effects of noise signal present in the sensor signal. This is a very effective method to cancel out the random noise components of the signal, and is applicable in tools having multiple and symmetrically placed (with respect to the radiation source) sensors. A zero value at the fundamental rotational frequency would indicate that the tool and the MWD sensor is rotating in a circular path that is concentric with the borehole. A non-zero value at the fundamental rotational frequency would indicate an eccentered condition, and would reflect the amount of correction needed to adjust for the eccentered condition once the effects of environment and the borehole on the magnitude of the signal are understood. The signal can be recorded digitally, and the FFT analysis performed with a surface computer 40. Only the important peaks in the frequency need to be stored by downhole memory device or computer 34 for subsequent analysis. The FFT analysis could be performed at the surface to compensate the MWD sensor signal as it is collected downhole using digital signal processing systems, such that the system is capable of real-time data processing of the MWD sensor signal.

The variations of the detector signal verses time for an eccentered tool is caused by the change in the detector position as the MWD sensor is turned first toward the borehole wall and then away from the borehole wall. Between these two extreme positions, the highest and lowest signals in the detectors will be produced. Assuming that the rotational frequency of the sensor is constant, and that the position of the eccentered tool axis in the borehole is fixed, the signal varies sinusoidally with a frequency that is equal to the rotational frequency of the MWD sensor in the borehole. The peak that occurs in the frequency FFT spectra corresponding to the primary turning motion may be referred to as the primary rotational peak. If motions other than the rotation of the MWD sensor are superimposed upon this primary turning motion, these motions will be evident in the frequency spectra in the form of additional peaks or broadening of the existing peaks. Complex orbiting motions, as well as lateral and angular oscillations whirling and precessing (rolling on the borehole wall with or without slipping) of the MWD sensor, will produce such additional or broadening peaks. It might be expected that a typical frequency spectra of the transformed signal would thus contain (a) a component related to the average value of the detector signal, (b) a peak corresponding to the fundamental rotational frequency of the MWD sensor in the borehole, (c) various minor peaks corresponding the other motions of the sensor induced by the drill string, such as vibration, oscillation, and bending or wrap-up of the drill string, and (d) high or low noise frequency components.

The generated compensating signal is thus a function of the amount of eccentering, with eccentering being defined as the distance between the axis of the logging tool 10 and the axis of the borehole. Since the compensation signal is also a function of borehole diameter and the difference between formation and mud density, the final solution will involve an iterative process to determine these variables. If mud density is equal to the formation density, there will be no compensation signal produced since the effect of mud density equaling the formation density on the sensor is the same as if no eccentering is occurring. It should be understood that other prior art techniques may be used to determine the borehole diameter and thereby eliminate borehole diameter as an unknown. The techniques of the present invention, when used in conjunction with a prior art technique which determines borehole diameter such as described in the previously referenced articles, will provide a formation density measurement which is free of the effects of eccentering.

The technique of the present invention is applicable to various sensors, including nuclear, electromagnetic, acoustic, and other MWD logging sensors that are sensitive to eccentering conditions. A gamma-gamma density tool was selected for a demonstration project of the FFT analysis technique, although this selection is not intended to limit the scope of the invention. A Sperry-Sun SFD formation logging tool was chosen for the demonstration project because the effects of eccentering are easily demonstrated in this tool. The signals were processed with a micro processor to analyze the time varying signals using a fast fourier transform (FFT). The data collection times were intentionally short, typically from 0.1 to 100 milliseconds per sample, in order to fully resolve the possible high frequency motion of the tool in the borehole. It was believed that a signal collected at approximately every quarter turn of revolution of the tool provides a sufficient signal to illustrate the benefits of the present invention. In order to obtain the necessary sample rate in field situations, detectors with high efficiencies may be used, e.g., scintillators. Short data collection times will also minimize the effects of spacial smearing of the detector signal due to movement of the drill collar and sensor, and increase the high frequency resolution of the technique. In order to satisfy the Nyquist limit, however, at least two samples must be taken for each cycle of the highest frequency that is present in the signal from the MWD detector.

For the demonstration project, the MWD logging tool was a gamma-gamma density tool of the type offered by Sperry-Sun under the SFD trademark. In practice, the approximate mud density will be known, and for a given situation it may safely be presumed that the mud density is less than the density of the formation. In this situation, the average signal from the density tool decreases as the average distance from the sensors to the wall of the formation decreases when the eccentered tool rotates in the borehole. This reduced signal generally would be interpreted to indicate that the formation is in fact more dense than it actually is. According to the concept of the present invention, this lower density signal is corrected for the effect caused by the tool being off-center in the borehole by using the compensating signal generated by the eccentered and rotating tool, and the corrected information is then plotted for more accurate analysis of the true downhole condition. In other cases, the operator may know that the mud is in fact more dense than the formation. In this case, the compensating signal decreases to a lower value, thereby causing the desired increase in the calculated density, so that the output data and the plotted log would be the same as if the tool was actually centered concentrically in the borehole.

Figure 3:
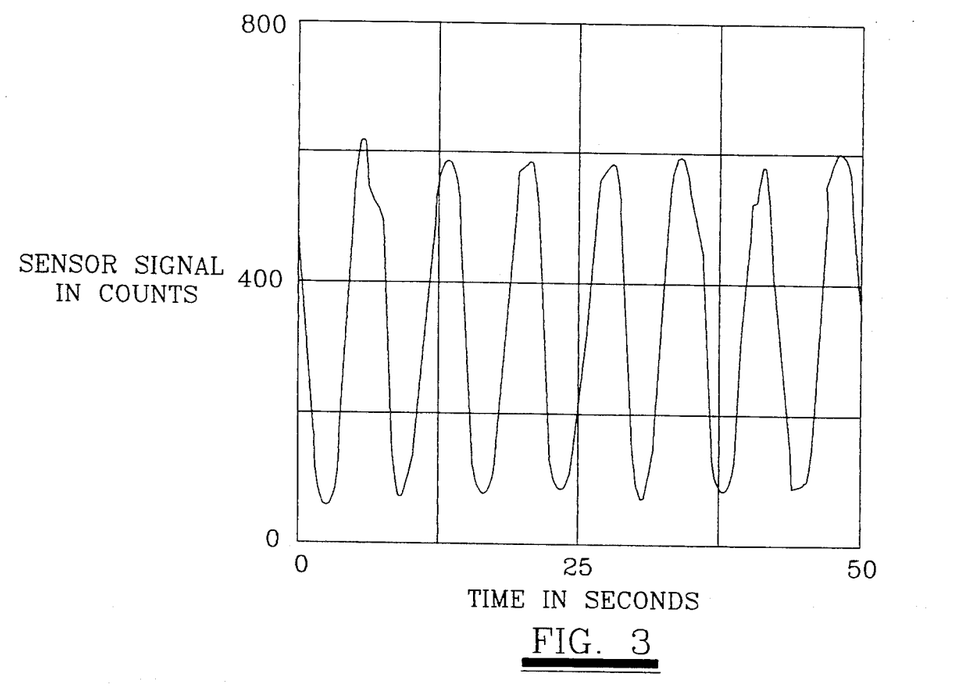
FIG. 3 depicts a graph of one MWD formation density signal plotted as a function of time for an eccentrically rotating drill collar.
Figure 4:
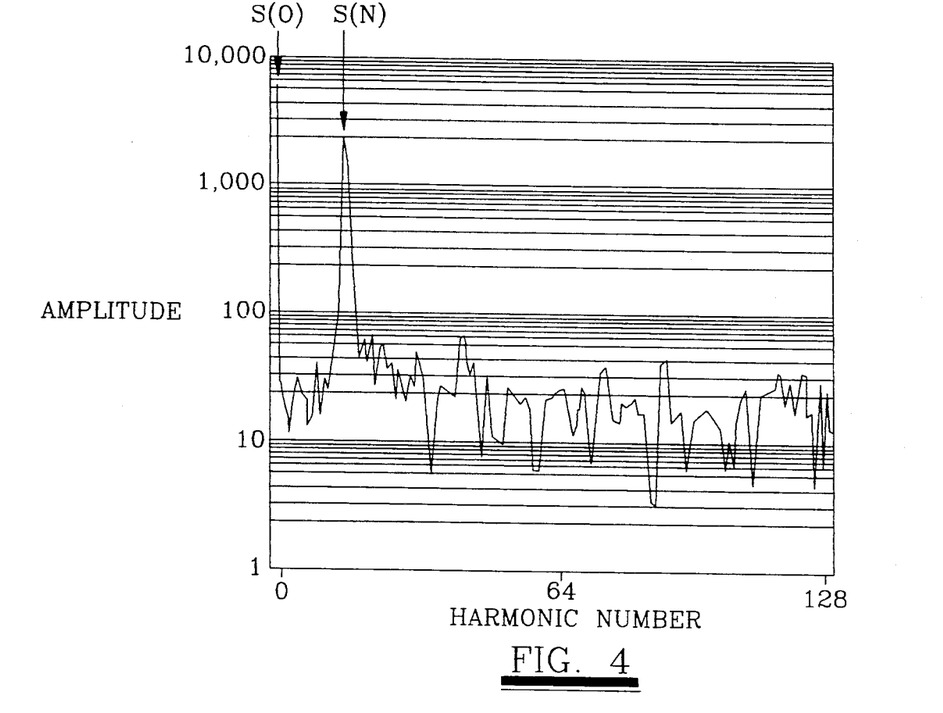
FIG. 4 depicts a graph of FFT frequency spectra of the time varying signal shown in FIG. 3.

FIG. 3 depicts an exemplary graph of an MWD signal as a function of time for the Sperry Sun tool described above. According to prior art techniques, the signals were averaged and plotted as an MWD log. If a signal was taken every ½ second, 25 data points representing 12.5 seconds in time could be averaged, and that average value plotted for the depth of the sensor during that 12.5 second period. According to the present invention, this time-varying signal from the sensor from the sensor is analyzed and its frequency components determined. This analysis may be performed by a commercially available FFT analysis program, although other analysis techniques may be used to determine the frequency components of the time varying signal. FIG. 4 depicts the harmonic frequency components according to an FFT analysis. The peak designated as $s(n)$ clearly depicts the frequency of the eccentric rotation of the drill collar. The amplitude at the $s(n)$ peak is related to the degree of eccentering, so that this amplitude may be used to calibrate a correction signal to determine a more accurate MWD signal, i.e. representing the signal the sensor would have generated had the tool been concentrically rotating. The peak $s(0)$ is related to the average signal over the sample time interval, and when analyzed and corrected for the effects of eccentering, borehole size and mud density, is a measure of the formation density. It is affected by eccentering and is thus corrected to the correct value by the compensating signal generated from the amplitude of the primary rotational peak, $s(n)$.

In any case, the signals from the detectors of the MWD sensors are measured and recorded as a function of time, rather than averaging the signals as was done in the prior art. As previously noted, the detectors of the density tool are preferably spaced longitudinally and axially around the inside of the drill collar. This arrangement has a significant advantage over placing the detectors on one side of the tool, since the bank of signals in the preferred tool illustrate a phase angle difference between pairs of sensor banks which allows a determination of the relative orientation of the eccentered tool in the borehole with respect to the orientation when the source 26 is closet to the borehole wall. It should be remembered that the time varying component of the signal will indicate either a condition wherein the tool is eccentrically rotating in the borehole having a substantially circular configuration, or a condition wherein the drill collar is concentrically rotating in a borehole which has an irregular configuration, e.g., elliptical. The compensating signal may thus be used to correct either the error caused by eccentric rotation of the tool or the error caused by the eccentric borehole.

The time varying component of the MWD sensor signal is thus functually related to the difference in the density, porosity, or other characteristics of the formation relative to the corresponding characteristic of the mud in the borehole. In general, the amplitude of the time varying part of the MWD signal increases as the difference between the formation characteristic and the borehole fluid characteristic increases, increases as the difference between the diameter at the MWD tool and the diameter of the borehole increases, and increases as the amount of eccentering of the tool in the borehole increases.

At the surface, a fast fourier transform of the MWD sensor signal (preferably a digital signal) verses time as taken, and the frequency spectra examined, e.g., preferably by the computer 40, for evidence of rotation of the MWD sensor. Rotation is apparent by a peak in the frequency FFT spectra corresponding to the frequency of rotation of the MWD sensor in the drill collar, as shown in FIG. 4. The frequency FFT spectra may be plotted, if desired, and visually analyzed or analyzed by a computer program to easily determine the rate of rotation of the tool in the borehole. The analysis may be used to directly compensate for the effects of eccentering of the sensors, since the peak of the frequency FFT spectra which correspond to the fundamental rotational frequency is a direct function of the magnitude of the eccentering. The variation of the detector signal verses time for an eccentered tool is thus caused by the change in the detector signal as the MWD sensor is turned first toward the wall and then away. Between the two extreme positions, the highest and lowest signals in the detector will be produced. The signal varies periodically with a frequency that is equal to the rotational motion of the tool in the borehole. The time varying component of the signal from the detectors will have a zero value either when the tool is centered in the borehole, when the tool is eccentrically rotating and the mud density or other formation characteristic is equal to the formation density or similar characteristic, or a situation where the tool is not rotating. If motions other than pure eccentric rotation of the tool are superimposed upon the primary eccentric turning motion of the tool, these motions will also be evident in the frequency spectra in the form of additional peaks. The time varying signal can be recorded digitally and FFT analysis optionally performed downhole by computer 34, with only the important peaks in the frequency stored for subsequent verification and analysis. Preferably, the time varying signal may be input in real time by the MWD tool to the surface, where it is then analyzed and plotted in real time to the drilling operator.

The compensating signal generated according to the present invention is obtained by generating more useful information apart from an average signal from the time varying signal produced in the detector banks as the tool eccentrically rotates. The amplitude of the FFT analysis plot of the signal increases as eccentering increases, and this part of the detector signal can be processed to reflect the degree of eccentering. In most cases, the effects caused by eccentering can be ignored for boreholes from 8 inches in diameter or smaller, but the error caused by the eccentrically rotating tool is significant for larger boreholes.

In order to properly correct the detector signals for the effects of eccentering, the relationship between the FFT spectra of the MWD sensor signal produced by the eccentered tool and the FFT of the signal measured with the tool concentrically rotating is first determined. Consider the example where the tool is rotating in a pure eccentric motion by a constant amount E, with the eccentric rotation being at a frequency F (the axis of rotation if the tool remains stationary but spaced from the axis of the borehole). If the frequency components at the time varying signal is plotted as a frequency spectra, there will be two peaks in the frequency FFT spectra, namely $s(0)$ and $s(n)$. The component $s(n)$ corresponds to the frequency for the eccentered rotation of the tool and will occur at a harmonic number, n, corresponding to the frequency F of rotation. The $s(0)$ peak corresponds to the average value of the signal during the time period that the time varying was collected. The relationship between $s(0)$ and $s(n)$ and the amount of eccentering E provides a means of correcting the average signal value taken at a particular depth. The $s(0)$ peak will have a large amplitude and the $s(n)$ peak a small amplitude if the amount of eccentering is slight, while the amplitude of $s(0)$ will decrease and $s(n)$ will increase if the amount of eccentering increases (assuming all other variables remain constant, i.e. formation density, borehole diameter, and mud density). This relationship can be mapped out by a series of experiments for a specific downhole tool by making measurements with successively greater eccentering of the tool in a test formation. Since the amplitude of the rotational signal $s(n)$ is zero when the tool is centered in the borehole, this provides a convenient calibration point for $s(n)$. In this manner, the sensor signal from an eccentrically rotating tool can be corrected to the same value as if the tool was concentrically rotating, by determining the relationship that exists between E, $s(n)$, $s(0)$, the borehole diameter, the borehole fluid, and other environmental parameters. The result is thus a correction signal representing the signal from the sensor had the tool been centered in the borehole. Accordingly, the correction of the signals allows one to determine more accurately the density of the formation, which is the purpose of the logging tool used in this example.

The present invention may also be used to detect whirling or precession of the tool in the borehole. During this motion, the source 16 is stationary or moving with a different rotational velocity with respect to the borehole wall than the case where the tool axis is stationary, while the tool itself executes a faster rotation by rolling and/or slipping around or against the borehole. Since the source is not moving or moving very slowly with the borehole wall, the apparent rotational speed is zero. This slow precessional motion can be observed in the FFT as two or more motions, even at the high rotational frequencies that occur in actual drilling operation. The particular motion of the tool in the borehole can be identified by comparing the FFT of actual signals to the computer generated frequency FFT spectra of accumulated complex tool motions. The FFT analysis can also be used to detect periodic or perhaps nonperiodic motions by signature analysis of the FFT and comparison to a data base of FFT signatures of various motions. The present technique can thus provide the capability of detecting precessional other types of motion, and correcting the effects caused thereby.

The sampling should occur at time intervals less than one-half the period of the highest frequency of the periodic movement of the drill collar axis with respect to the borehole axis. Since the sensor frequency should be designed to detect all periodic movement of the drill collar axis, the sampling rate should be less than one-half the highest frequency present in the sensor signal, whether the signal variation is caused by eccentric rotation of the tool about a stationary axis, tool axis motion, or a combination thereof.

Other possible motions of the MWD tool in the borehole may also affect the MWD sensor response. Lateral vibrations given by the drill string location and orbiting around the borehole, as well as complex and aperiodic motions, are among those which could be most difficult to analyze. Accumulations of the tool response taken from eccentered and stationary tools at several eccentric positions and different angular orientations will provide a basic understanding of the MWD response.

The FFT analysis technique of the sensor data described above is applicable to all MWD sensors which are sensitive to the effects of eccentering. In most field situations, some eccentering will be present, and thus rotational peaks of the FFT of the MWD sensor signal will occur provided the tool is rotating and the formation characteristic sensed is not equal to the corresponding characteristic of the mud. For diagnostic purposes, the technique of the present invention may be used for determining the rotational frequency of the MWD tool or for studying or analyzing any condition that remove the cylindrical symmetry of the tool, the borehole, or the formation as the tool is rotated, thereby producing a time varying signal of the MWD sensors. As previously noted, an analysis of the time varying signal other than an FFT analysis may be performed, although it is a feature of the present invention that the frequency spectra of the time varying signals be determined, so that the magnitude of the peak in that spectra corresponding to the eccentered rotation may be used to determine the correction signal to compensate for the eccentric motion and thereby generate a more accurate log.

By using cross correlation or other similar signal processing technique between pairs of time varying bank signals from different sensors banks, the effects of noise contained in these signals can be substantially reduced. This is another advantage of the multiple sensor bank tool, especially one in which pairs of banks are arranged symmetrically with respect to the source. The increase of the signal to noise ratio can thus be large compared to the unprocessed signals.

Various changes and modifications will become apparent from the foregoing discussion and are considered within the scope of the present invention. Only one type of MWD tool and one type of sensor had been described in detail herein, although the concepts of the present invention may be used with various tools and various downhole sensors. These and other changes and modifications will become apparent from the foregoing description, and should be understood as being within the scope of the appended claims.

What is claimed is:

1. A method of generating a corrected well log based on erroneous signals from a downhole sensor on a drill collar rotating in a borehole, the signal error being attributable at least in part to periodic movement of the drill collar axis with respect to the borehole axis or eccentric rotation of the drill collar with respect to the borehole, the method comprising:

generating a plurality of discrete sensor signals at time intervals of less than one-half of the period of the highest presumed frequency of the period movement of either the drill collar axis with respect to the borehole axis or the eccentric rotation of the drill collar with respect to the borehole;

averaging the plurality of discrete sensor signals to generate an average sensor signal as a function of borehole depth;

recording the plurality of discrete sensor signals as a function of time to generate a time-varying sensor signal profile;

determining the magnitude of frequency components of the time-varying sensor signal profile;

correcting the average sensor signal as a function of the determined magnitude of the frequency components; and recording the corrected sensor signal as a function of borehole depth to generate a corrected well log.

2. The method as defined in claim 1, further comprising:

positioning the downhole sensor and an MWD transmitter within a measurement-while-drilling tool including the drill collar; and transmitting the average sensor signal to the surface utilizing the MWD transmitter.

3. The method as defined in claim 1, further comprising:

selecting the downhole sensor from a group consisting of acoustic, gamma, neutron, and electromagnetic sensors; and positioning a plurality of selected sensors circumferentially and axially within the drill collar.

4. The method as defined in claim 1, further comprising:

determining sensor response to differences between formation properties and corresponding properties of drilling fluid in the annulus between the drill collar and the formation; and correcting the average sensor signal as a function of the determined differences between formation properties and the drilling fluid properties.

5. The method as defined in claim 1 further comprising:

storing the discrete sensor signals within a downhole memory device; and outputting the stored discrete sensor signals from the memory device after the drill collar is returned to the surface.

6. The method as defined in claim 5, further comprising:

transmitting the average sensor signals to the surface while drilling;

recording the transmitted average sensor signals as a function of borehole depth to generate a well log; and the step of recording the corrected sensor signal includes plotting the corrected sensor signals as a function of borehole depth and in response to the discrete sensor signals output after the drill collar is returned to the surface to generate a corrected well log.

7. The method as defined in claim 1, further comprising:

plotting the magnitude of frequency components of the time-varying sensor signal profile; and comparing the plotted frequency components to a previously plotted frequency component profile for a predetermined borehole or formation conditions.

8. The method as defined in claim 1, further comprising:

plotting the magnitude of frequency components of the time-varying sensor signal profile;

selecting a frequency component of the time-varying sensor signal profile attributable to eccentric rotation of the drill collar with respect to the borehole axis or periodic movement of the drill collar axis with respect to the borehole axis.

9. The method as defined in claim 1, further comprising:

rotating the drill collar within a highly deviated borehole; and the step of generating discrete sensor signals includes generating the signals at time intervals of less than one-half the period of eccentric rotation of the drill collar with respect to the borehole.

10. The method as defined in claim 1, further comprising:

determining the actual rotational velocity of the drill collar as a function of the determined magnitude of the frequency components of the time-varying sensor signal profile.

11. A method of correcting erroneous signals from a downhole sensor on a drill collar at the lower end of a drill string, the drill collar rotating within a borehole, the signal error being attributable at least in part to eccentric rotation the drill collar axis with respect to the borehole axis, the method comprising:
   generating a plurality of discrete sensor signals while drilling at time intervals of less than one-half of the period of rotation of the drill collar;
   averaging the plurality of discrete sensor signals to generate an average sensor signal as a function of depth;
   transmitting the average sensor signal to the surface through the drill string;
   recording the plurality of discrete sensor signals as a function of time to generate a time-varying sensor signal profile;
   determining the magnitude of frequency components of the time-varying sensor signal profile;
   selecting a frequency component of the time-varying sensor signal profile attributable to eccentric rotation of the drill collar within the borehole; and
   correcting the averaged sensor signal as a function of the magnitude of the selected frequency component.

12. The method as defined in claim 11, further comprising:
   recording the corrected sensor signal as a function of depth to generate a corrected well log.

13. The method as defined in claim 11, further comprising:
   positioning a plurality of sensors circumferentially and axially within the drill collar;
   determining to differences between the formation properties and corresponding properties of drilling fluid in the annulus between the drill collar and the formation; and
   correcting the average sensor signal as a function of the determined differences between the formation properties and the drilling fluid properties.

14. The method as defined in claim 13, further comprising:
   cross-correlating pairs of discrete sensor signals each from a different one of the plurality of circumferentially positioned sensors within the drill collar to reduce the effects of noise in the sensor signals.

15. The method as defined in claim 11, further comprising:
   storing the discrete sensor signals within a downhole memory device;
   outputting the stored discrete sensor signals from the memory device after the drill collar is returned to the surface; and
   recording the corrected sensor signal as a function of borehole depth and in response to the discrete sensor signals output after the drill collar is returned to the surface to generate a corrected well log.

16. The method as defined in claim 11, further comprising:
   plotting the magnitude of frequency components of the time-varying sensor signal profile; and
   comparing the plotted frequency components to a previously plotted frequency component profile for a predetermined borehole or formation condition.

17. The method as defined in claim 11, further comprising:
   generating established frequency component profiles each representing known asymmetrical borehole conditions;
   plotting the magnitude of a frequency components of the time-varying sensor signal profile; and
   comparing the plotted frequency component profile to the established frequency component profiles to determine the borehole conditions from the plurality of discrete sensor signals.

18. The method as defined in claim 1, further comprising:
   determining the actual rotational velocity of the drill collar as a function of the determined magnitude of the frequency components of the time-varying sensor signal profile.

19. A method of correcting a well log based on erroneous signals attributable to periodic movement of the drill collar axis with respect to the borehole axis, eccentric rotation of the drill collar with respect to the borehole, or whirling or precessing of a drill collar at the lower end of a drill string in a borehole, the drill collar having a plurality of downhole sensors for sensing borehole or formation conditions, the method comprising:
   generating a plurality of discrete sensor signals while drilling at time intervals of less than one-half of the period of the highest presumed frequency of periodic movement of the drill collar axis with respect tot he borehole axis having a significant affect on signal error;
   averaging the plurality of discrete sensor signals to generate an average sensor signal as a function of depth;
   recording the plurality of discrete sensor signals as a function of time to generate a plurality of time-varying sensor signal profiles;
   determining the magnitude of frequency components of the time-varying sensor signal profiles; and
   correcting the average sensor signal as a function of the determined magnitude of the frequency components.

20. A system for generating a corrected well log based on erroneous signals from a downhole sensor on a drill collar rotating in a borehole, the signal error being attributable at least in part to periodic movement of the drill collar axis with respect to the borehole axis, a system comprising:
   sensor means for generating a plurality of sensor signals at time intervals of less than one-half of the period of the highest presumed frequencies of the periodic movement of the drill collar axis with respect tot he borehole axis having a significant affect on signal error;
   computer means for recording the plurality of sensor signals as a function of time to generate a time-varying sensor signal profile, and for determining the magnitude of frequency component at the time-varying sensor signal profile,;
   signal processing means for averaging the plurality of discrete sensor signals to generate an average sensor signal as a function of borehole depth, and for correcting the averaged sensor signal as a function of the determined magnitude of the frequency components; and recording means for plotting the corrected sensor signal as a function of borehole depth to generate a corrected well log.

21. The system as defined in claim 20, further comprising:
   an MWD tool for generating the plurality of discrete sensor signals while drilling; and
   an MWD transmitter within the MWD tool for forwarding the average sensor signal to the surface.

22. The system as defined in claim 21 further comprising:
   the computer means including storing means within the MWD tool for recording the plurality of discrete sensor signals while the MWD tool is within the borehole.

23. The method as defined in claim 19, further comprising:
   plotting the magnitude of frequency components of the time-varying sensor signal profile;
   comparing the plotted frequency components to a previously plotted frequency component profile for a predetermined borehole or formation conditions; and
   selecting the frequency component of the plotted time-varying sensor signal profile attributable to period movement of the drill collar axis with respect to the borehole axis or eccentric rotation of the drill collar with respect to the borehole.

24. A method of monitoring borehole or formation conditions and detecting whirling or precessing of a drill collar at the lower end of a drill string eccentrically rotating at a uniform rotational velocity within the borehole, the method comprising:

(a) positioning a downhole sensor on the drill collar for sensing borehole or formation conditions as a function of time;
(b) generating a plurality of discrete signals from the sensor while drilling;
(c) transmitting the plurality of discrete signals to the surface while drilling;
(d) averaging the transmitted signals to monitor borehole or formation conditions;
(e) recording the plurality of discrete signals as a function of time to generate a plurality of time-varying sensor signal profiles;
(f) detecting successive peaks in the plurality of sensor signal profiles caused by changing radial spacing between the sensor and the borehole wall as a drill collar eccentrically rotates within the borehole; and
(g) detecting a frequency shift in the detected peaks of the plurality of sensor signal profiles indicative of whirling or precessing of the drill collar.

25. A method as defined in claim 24, further comprising:
   selecting a downhole sensor from a group consisting of acoustic, gamma, neutron, and electromagnetic sensors; and
   positioning a plurality of selected sensors circumferentially and axially within the drill collar.

26. A method as defined in claim 24, wherein steps (f) and (g) further comprise:
   determining the frequency components of the time-varying sensor signal profiles; and
   detecting a shift in the frequency components indicative of whirling or precession of the drill collar.

* * * * *

UNITED STATES PATENT AND TRADEMARK OFFICE
CERTIFICATE OF CORRECTION

PATENT NO. : 5,058,077
DATED : October 15, 1991
INVENTOR(S) : James R. Twist It is certified that error appears in the above-identified patent and that said Letters Patent is hereby corrected as shown below:

In Column, 16, line 33 (Claim 19, line 13), change "tot he" to --to the--.

In Column, 16, line 56 (Claim 20, line 11), change "tot he" to --to the--.

In Column, 16, line 61 (Claim 20, line 16), change "component" to --components--.

Signed and Sealed this

Twentieth Day of April, 1993

Attest:

MICHAEL K. KIRK

*Attesting Officer*      *Acting Commissioner of Patents and Trademarks*